(12) United States Patent
Morita

(10) Patent No.: US 11,813,945 B2
(45) Date of Patent: Nov. 14, 2023

(54) VEHICLE

(71) Applicant: SUBARU CORPORATION, Tokyo (JP)

(72) Inventor: Tomohiro Morita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 6 days.

(21) Appl. No.: 17/736,163

(22) Filed: May 4, 2022

(65) Prior Publication Data

US 2022/0363134 A1 Nov. 17, 2022

(30) Foreign Application Priority Data

May 13, 2021 (JP) ................................. 2021-081549

(51) Int. Cl.
| | |
|---|---|
| *H02P 27/06* | (2006.01) |
| *B60L 3/00* | (2019.01) |
| *B60R 16/02* | (2006.01) |
| *B60R 16/03* | (2006.01) |
| *B60K 7/00* | (2006.01) |

(52) U.S. Cl.
CPC ............ *B60L 3/003* (2013.01); *B60K 7/0007* (2013.01); *B60R 16/0207* (2013.01); *B60R 16/03* (2013.01); *H02P 27/06* (2013.01)

(58) Field of Classification Search
CPC .... H02P 27/06; H02P 3/12; H02P 6/24; H02P 6/14; H02J 7/24
See application file for complete search history.

(56) References Cited

U.S. PATENT DOCUMENTS

2017/0113569 A1* 4/2017 Lai ........................... H02P 6/04

FOREIGN PATENT DOCUMENTS

JP 2013-110838 A 6/2013

* cited by examiner

*Primary Examiner* — Muhammad S Islam
(74) *Attorney, Agent, or Firm* — TROUTMAN PEPPER HAMILTON SANDERS LLP

(57) ABSTRACT

A vehicle includes a motor, an inverter, an inter-line short circuit, an operation circuit, and a harness. The motor is provided in a wheel. The inverter is configured to supply electric power to the motor. The inter-line short circuit is provided in the wheel and configured to cause the motor to be short-circuited when not in operation and couple the motor and the inverter when in operation. The operation circuit is provided in a vehicle body of the vehicle and configured to operate the inter-line short circuit. The harness extends between the wheel and the vehicle body. In the harness, at least one power supply line, which is configured to supply electric power to the motor through the inverter and the inter-line short circuit, and an operation line, which is configured to couple the inter-line short circuit and the operation circuit, are bundled.

12 Claims, 6 Drawing Sheets

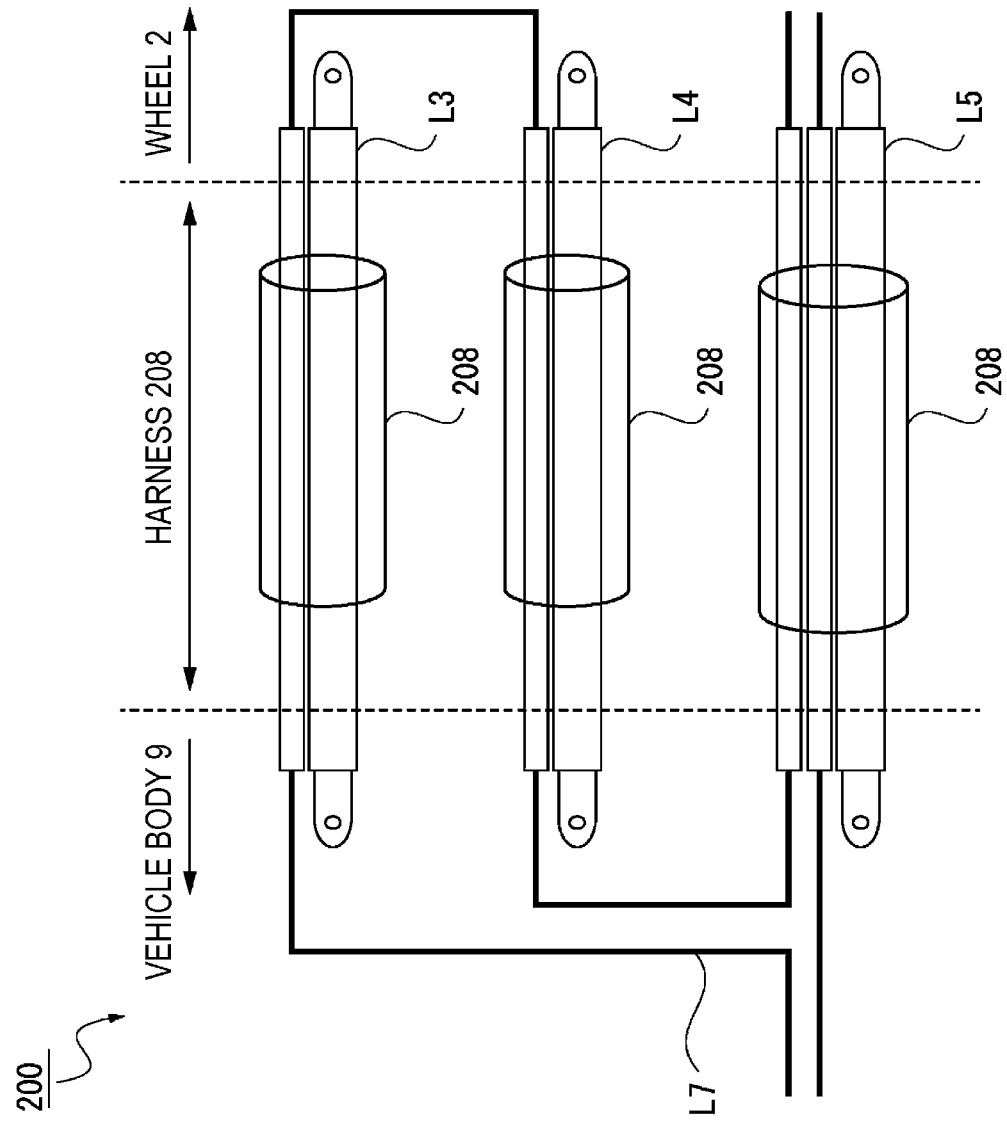

VEHICLE

CROSS-REFERENCE TO RELATED APPLICATION

The present application claims priority from Japanese Patent Application No. 2021-081549 filed on May 13, 2021, the entire contents of which are hereby incorporated by reference.

FIELD OF THE INVENTION

The disclosure relates to a technical field of a vehicle including an in-wheel motor.

BACKGROUND

A vehicle including a short-circuit relay that switches a coupling object for three-phase motor lines, which are coupled to a motor, from an inverter to each other has been proposed (see, for example, Japanese Unexamined Patent Application Publication No. 2013-110838). This vehicle controls the short-circuit relay to switch the coupling object for the motor lines from the inverter to each other in response to an input of a signal indicating that a collision has occurred.

SUMMARY

An aspect of the disclosure provides a vehicle including a motor, an inverter, an inter-line short circuit, an operation circuit, and at least one harness. The motor is provided in a wheel. The inverter is configured to supply electric power to the motor. The inter-line short circuit is provided in the wheel and configured to cause the motor to be short-circuited in a case where the inter-line short circuit is not operated and couple the motor and the inverter in a case where the inter-line short circuit is operated. The operation circuit is provided in a vehicle body of the vehicle and configured to operate the inter-line short circuit. The at least one harness extends between the wheel and the vehicle body. In the at least one harness, at least one power supply line and an operation line are bundled. The at least one power supply line is configured to supply electric power to the motor through the inverter and the inter-line short circuit. The operation line is configured to couple the inter-line short circuit and the operation circuit.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 6 illustrates electrical couplings in a vehicle according to a third embodiment.

DETAILED DESCRIPTION

Vehicles driven by in-wheel motors, which are motors provided in wheels, have been proposed. When such a vehicle experiences a collision, for example, and a wheel thereof comes off the vehicle body, a motor also comes off the vehicle body together with the wheel.

If a rotor included in the motor that has come off the vehicle body continues to rotate, an induced voltage is generated in the motor, and the induced voltage may cause a secondary damage, such as electric shock. Accordingly, vehicles including in-wheel motors with increased safety in case of separation of a wheel are desired.

It is desirable to increase safety in case of separation of a wheel.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
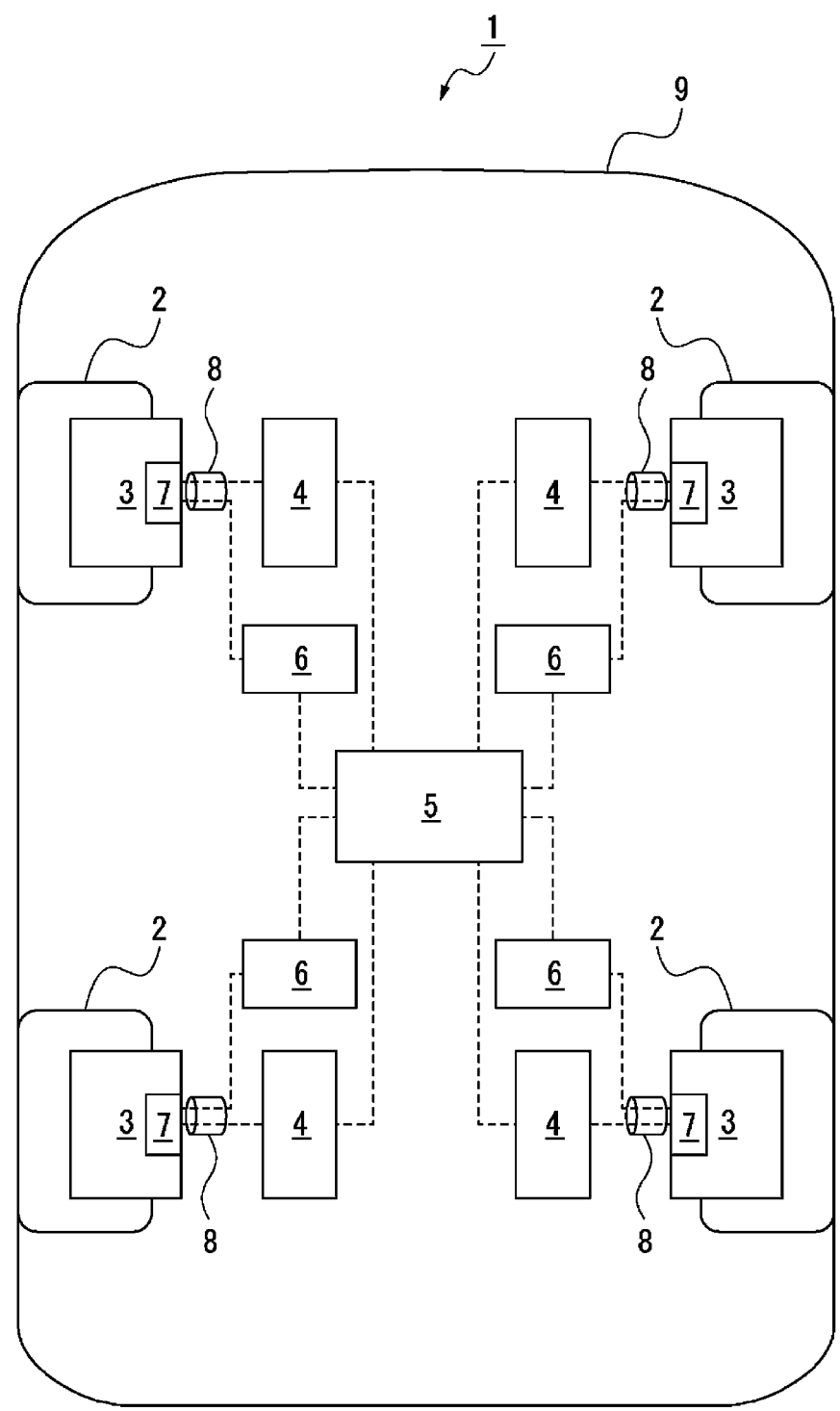
FIG. 1 illustrates a general configuration of a vehicle including motors.

FIG. 1 illustrates a general configuration of a vehicle 1 including motors 3. FIG. 1 illustrates only the configuration of a main part of the vehicle 1 that is relevant to an embodiment of the disclosure.

As illustrated in FIG. 1, the vehicle 1 includes wheels 2, the motors 3, inverters 4, a control device 5, operation circuits 6, inter-line short circuits 7, and harnesses 8. The vehicle 1 is an electric automobile including the motors 3 as a power source. The vehicle 1 may instead be a hybrid automobile including the motors 3 and an engine as a power source.

The inverters 4, the control device 5, and the operation circuits 6 are provided in a vehicle body 9. The motors 3 and the inter-line short circuits 7 are provided in the wheels 2. The inverters 4 and the operation circuits 6 are coupled to the inter-line short circuits 7 with the harnesses 8.

The vehicle 1 has four wheels 2. The motors 3 are in-wheel motors, each of which is provided in one of the four wheels 2. The motors 3 may instead be provided only in some of the wheels 2.

The motors 3 are, for example, three-phase alternating current motors. The motors 3 generate driving force (torque) when electric power is supplied thereto from a battery (not illustrated) through the inverters 4. The driving force is transmitted to the wheels 2 to drive the vehicle 1.

The motors 3 also function as generators, and perform a regenerative operation to generate electricity. The electricity generated by the regenerative operation of the motors 3 is supplied to the battery through the inverters 4. Thus, the battery is charged.

The inverters 4 supply the electric power (currents) provided from the battery to the motors 3 under the control of the control device 5. In one example, the inverters 4 convert direct currents supplied from the battery into three-phase alternating currents and supply the three-phase alternating currents to the motors 3. When the motors 3 perform the regenerative operation, the inverters 4 convert alternating currents supplied from the motors 3 into direct currents and supply the direct currents to the battery.

The control device 5 is a processor including a central processing unit (CPU), a read only memory (ROM), and a random access memory (RAM). The control device 5 controls the overall operation of the vehicle 1 by loading a program stored in the ROM or a storage unit (not illustrated) into the RAM and executing the program.

The operation circuits 6 operate under the control of the control device 5. As described in more detail below, the operation circuits 6 operate the inter-line short circuits 7.

The inter-line short circuits 7 are operated by the operation circuits 6. As described in more detail below, the inter-line short circuits 7 cause the motors 3 to be short-circuited when the inter-line short circuits 7 are not operated and couple the motors 3 and the inverters 4 when the inter-line short circuits 7 are operated.

The harnesses 8 extend between the vehicle body 9 and the wheels 2. As described in more detail below, in each harness 8, power supply lines (U-phase power supply line L3, V-phase power supply line L4, and W-phase power supply line L5) and an operation line L7 are bundled (see FIG. 3). The power supply lines supply electric power to the motor 3 through the inverter 4 and the inter-line short circuit 7. The operation line L7 couples the operation circuit 6 and the inter-line short circuit 7.

Figure 2:
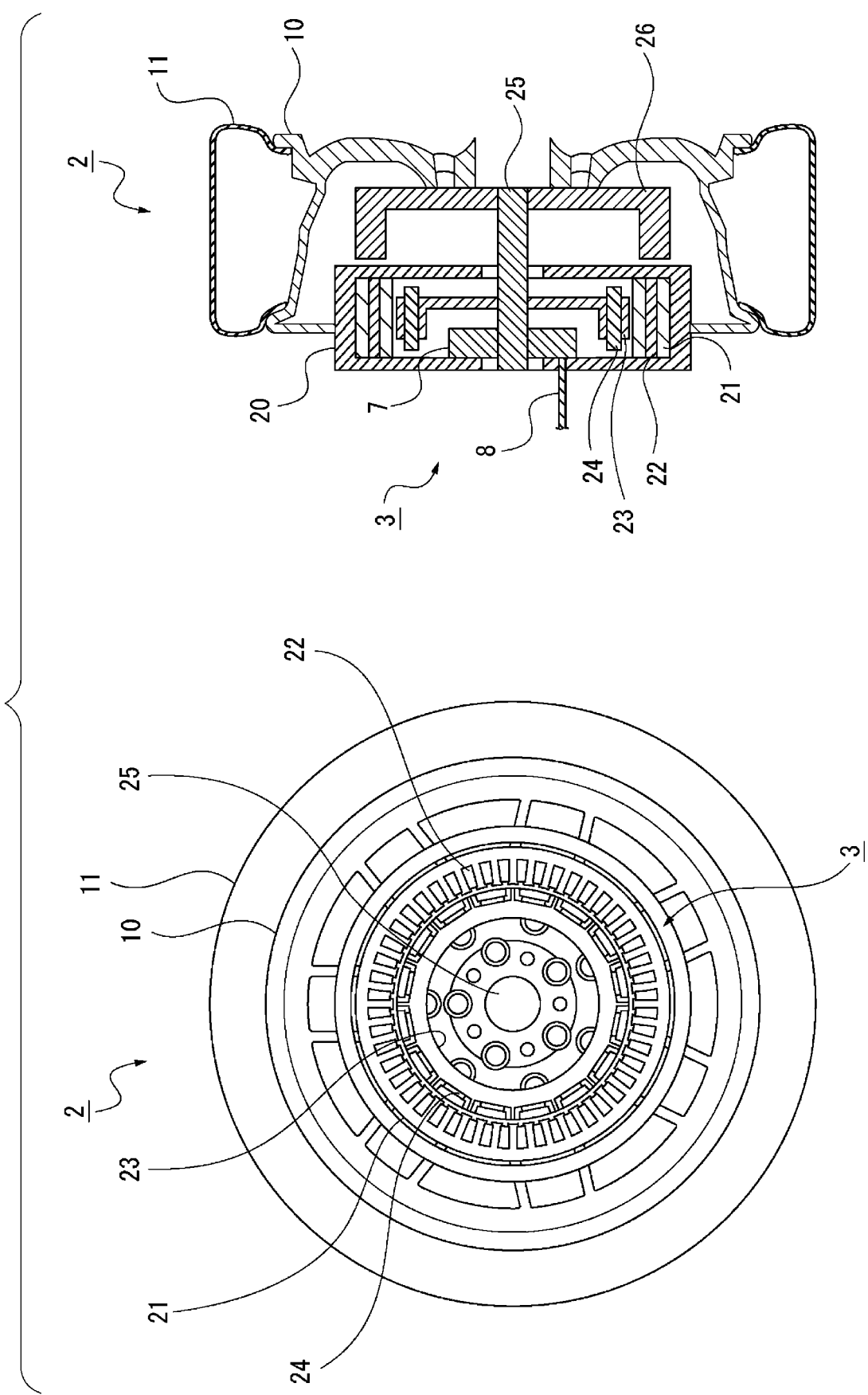
FIG. 2 illustrates the structures of a wheel and a motor.

FIG. 2 illustrates the structures of each wheel 2 and each motor 3. In FIG. 2, a front view of the wheel 2 and the motor 3 is illustrated at the left side, and a sectional view of the wheel 2 and the motor 3 is illustrated at the right side. Some components are omitted at the left side of FIG. 2.

As illustrated in FIG. 2, the wheel 2 includes a wheel body 10 and a tire 11. The wheel body 10 has a substantially cylindrical shape that is open at one end thereof in an axial direction. The motor 3 and the inter-line short circuit 7 are disposed in the wheel body 10.

The tire 11 is attached to the outer periphery of the wheel body 10.

The motor 3 includes a case 20, a stator 21, coils 22, a rotor 23, magnets 24, a shaft 25, and a flange 26.

The case 20 has a substantially cylindrical shape having an internal space. The case 20 contains the stator 21, the coils 22, the rotor 23, the magnets 24, and the shaft 25. The case 20 also contains the inter-line short circuit 7.

The case 20 is supported by the vehicle body 9 so that the wheel 2 can be turned.

The stator 21 is composed of a stack of electromagnetic steel sheets, for example, and has an annular shape overall. The stator 21 has a plurality of teeth that project radially inward and around which the coils 22, which are three-phase coils, are wound successively in the circumferential direction. The coils 22 receive alternating currents from the corresponding one of the inverters 4 (see FIG. 1).

The rotor 23 is disposed on the inner side of the stator 21 in the radial direction such that the rotor 23 is coaxial with the stator 21. The magnets 24 are disposed on the rotor 23 with predetermined intervals therebetween in the circumferential direction. The magnets 24 face the stator 21 (coils 22) in the radial direction. Thus, the motor 3 is a radial gap motor in which the stator 21 and the rotor 23 face each other in the radial direction.

The shaft 25 is disposed on the inner side of the rotor 23 in the radial direction, and rotates together with the rotor 23.

The shaft 25 is disposed in the case 20, and extends to the outside of the case 20 in a vehicle width direction (left-right direction).

The shaft 25 is rotatably supported by bearings (not illustrated) on the case 20. The flange 26 is fixed to the outer end of the shaft 25 in the vehicle width direction. Therefore, the flange 26 rotates together with the shaft 25. The wheel body 10 is fixed to the flange 26 with fastening members (bolts) that are not illustrated.

Accordingly, when the motor 3 is driven and the shaft 25 is rotated, the wheel 2 is rotated together with the shaft 25. As a result, the vehicle 1 moves.

The inter-line short circuit 7 is disposed in the motor 3 (case 20) at the inner side in the vehicle width direction of the vehicle body 9. In other words, the inter-line short circuit 7 is disposed in the case 20 on the inner side of the stator 21 and the rotor 23 in the radial direction and at the inner side in the vehicle width direction.

The harness 8 is coupled to the inner side of the case 20 in the vehicle width direction. The lines included in the harness 8 are coupled to the inter-line short circuit 7 and respective ones of the coils 22 in the case 20.

Figure 3:
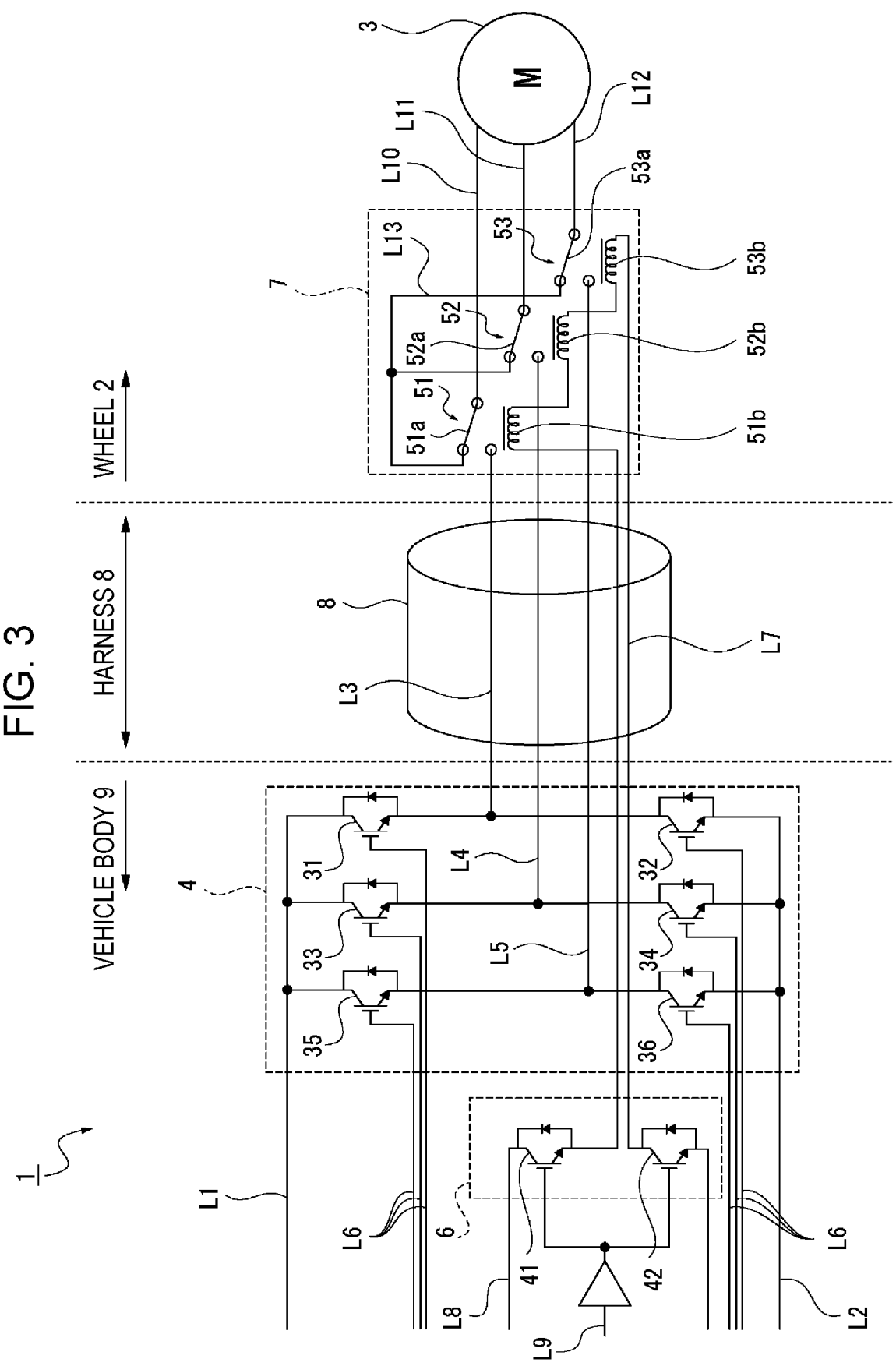
FIG. 3 illustrates electrical couplings in the vehicle.

FIG. 3 illustrates electrical couplings in the vehicle 1.

As described above, in the vehicle 1, the inverter 4 and the operation circuit 6 are provided in the vehicle body 9, and the motor 3 and the inter-line short circuit 7 are provided in the wheel 2. The inverter 4 and the operation circuit 6 are coupled to the inter-line short circuit 7 with the harness 8.

As illustrated in FIG. 3, the inverter 4 includes six switching elements 31 to 36. The switching elements 31 to 36 are, for example, insulated gate bipolar transistors (IGBTs), and diodes are coupled anti-parallel thereto.

The switching element 31 and the switching element 32 are coupled in series to form a U-phase leg (vertical arm). The switching element 33 and the switching element 34 are coupled in series to form a V-phase leg (vertical arm). The switching element 35 and the switching element 36 are coupled in series to form a W-phase leg (vertical arm).

The switching element 31, the switching element 33, and the switching element 35 are coupled to a direct-current power supply line L1. The switching element 32, the switching element 34, and the switching element 36 are coupled to a direct-current power supply line L2. The direct-current power supply line L1 and the direct-current power supply line L2 are coupled to the battery to supply electric power from the battery to the inverter 4.

The U-phase power supply line L3 is coupled to the coupling point between the switching element 31 and the switching element 32. The V-phase power supply line L4 is coupled to the coupling point between the switching element 33 and the switching element 34. The W-phase power supply line L5 is coupled to the coupling point between the switching element 35 and the switching element 36. The direct-current power supply lines L1 and L2, the U-phase power supply line L3, the V-phase power supply line L4, and the W-phase power supply line L5 are power supply lines that supply electric power to the motor 3.

The switching elements 31 to 36 operate under the control of the control device 5. In one example, the switching elements 31 to 36 operate when control signals from the control device 5 are input to gates thereof through signal lines L6, and output alternating currents of a predetermined frequency and voltage to the U-phase power supply line L3, the V-phase power supply line L4, and the W-phase power supply line L5.

The operation circuit 6 includes a switching element 41 and a switching element 42. The switching elements 41 and 42 are, for example, insulated gate bipolar transistors (IGBTs), and diodes are coupled anti-parallel thereto.

The switching elements 41 and 42 are coupled in series, and a predetermined direct current is supplied thereto through a direct-current power supply line L8. The operation line L7 extends between the switching elements 41 and 42.

The switching elements 41 and 42 operate under the control of the control device 5. In one example, the switching elements 41 and 42 operate when a control signal from the control device 5 is input to gates thereof through the signal line L9, and switch to allow or stop supply of a direct current to coils 51b to 53b of relays 51 to 53.

The harness 8 extends between the wheel 2 and the vehicle body 9, and the U-phase power supply line L3, the V-phase power supply line L4, the W-phase power supply line L5, and the operation line L7 are bundled in the harness 8.

The U-phase power supply line L3, the V-phase power supply line L4, and the W-phase power supply line L5 allow a relatively large current to flow therethrough, and therefore have diameters greater than that of the operation line L7. For example, the U-phase power supply line L3, the V-phase power supply line L4, and the W-phase power supply line L5 have a diameter of about 10 mm, and the operation line L7 has a diameter of about 1 mm. Accordingly, the operation line L7 is configured to break more easily than the U-phase power supply line L3, the V-phase power supply line L4, and the W-phase power supply line L5.

The inter-line short circuit 7 includes the relays 51 to 53. The relay 51 includes a coupling member 51a and the coil 51b. The relay 52 includes a coupling member 52a and the coil 52b. The relay 53 includes a coupling member 53a and the coil 53b.

The coupling member 51a has a common (COM) terminal coupled to a U-phase motor line L10, a normally closed (NC) terminal coupled to a short-circuit line L13, and a normally open (NO) terminal coupled to the U-phase power supply line L3.

The coupling member 52a has a COM terminal coupled to a V-phase motor line L11, an NC terminal coupled to the short-circuit line L13, and an NO terminal coupled to the V-phase power supply line L4.

The coupling member 53a has a COM terminal coupled to a W-phase motor line L12, an NC terminal coupled to the short-circuit line L13, and an NO terminal coupled to the W-phase power supply line L5.

In the following description, the U-phase motor line L10, the V-phase motor line L11, and the W-phase motor line L12 will be referred to simply as motor lines when they are not distinguished from each other.

The U-phase motor line L10 is coupled to the U-phase coils 22 of the motor 3. The V-phase motor line L11 is coupled to the V-phase coils 22 of the motor 3. The W-phase motor line L12 is coupled to the W-phase coils 22 of the motor 3. Thus, the U-phase motor line L10, the V-phase motor line L11, and the W-phase motor line L12 are motor lines that are directly coupled to the motor 3. The U-phase, V-phase, and W-phase coils 22 form a bridge circuit.

The short-circuit line L13 couples the NC terminals of the coupling members 51a to 53a of the relays 51 to 53 to each other.

In the vehicle 1 having the above-described configuration, no electric power is supplied to (no current flows through) any of the components when a start switch for activating the motor 3 is off. In this state, no direct current is supplied to the direct-current power supply line L8, and the operation line L7 is uncoupled from the direct-current power supply line L8 by the switching elements 41 and 42 of the operation circuit 6.

Accordingly, no direct current flows through the coils 51b to 53b provided at intermediate locations on the operation line L7, and therefore the COM terminal is coupled to the NC terminal at each of the coupling members 51a to 53a.

In this state, the U-phase motor line L10, the V-phase motor line L11, and the W-phase motor line L12 are coupled to each other through the coupling members 51a to 53a. Accordingly, the coils 22 of respective phases of the motor 3 are short-circuited to each other through the U-phase motor line L10, the V-phase motor line L11, the W-phase motor line L12, the short-circuit line L13, and the coupling members 51a to 53a.

When the start switch is turned on, the control device 5 is activated and electric power (current) is supplied to each component. For example, a direct current is supplied from the battery to the direct-current power supply line L1, and a predetermined direct current is supplied to the direct-current power supply line L8.

In addition, the control device 5 outputs a control signal for operating the switching elements 41 and 42 through the signal line L9. Accordingly, the direct-current power supply line L8 is electrically coupled to the operation line L7 so that a direct current is supplied to the coils 51b to 53b through the direct-current power supply line L8 and the operation line L7. Thus, the COM terminal is coupled to the NO terminal at each of the coupling members 51a to 53a.

As a result, the U-phase power supply line L3 is electrically coupled to the U-phase motor line L10, the V-phase power supply line L4 is electrically coupled to the V-phase motor line L11, and the W-phase power supply line L5 is electrically coupled to the W-phase motor line L12.

After that, the control device 5 outputs control signals through the signal lines L6 to operate the switching elements 31 to 36 of the inverter 4. Accordingly, alternating currents are supplied to the coils 22 of respective phases of the motor 3, and the vehicle 1 moves.

1.4 Operation in Case of Separation of Wheel 2

Assume that the vehicle 1 is externally impacted in a small overlap collision, for example, and the wheel 2 comes off the vehicle body 9. In such a case, the motor 3 also comes off the vehicle body 9 together with the wheel 2.

When the wheel 2 comes off the vehicle body 9 while the vehicle 1 is moving, the rotor 23 of the motor 3 may continue to rotate. In such a case, an induced voltage is generated in the motor 3 (between the motor lines) due to the rotation of the rotor 23. If the operation circuit 6 and the inter-line short circuit 7 are not provided as in the present embodiment, the motor lines are exposed, and the induced voltage may cause a damage, such as electric shock.

In contrast, the vehicle 1 according to the present embodiment includes the operation circuit 6 and the inter-line short circuit 7. When the vehicle 1 is externally impacted in a small overlap collision, for example, and the wheel 2 comes off the vehicle body 9, the harness 8 breaks. At this time, since the operation line L7 is configured to break more easily than the U-phase power supply line L3, the V-phase power supply line L4, and the W-phase power supply line L5, the operation line L7 breaks before the U-phase power supply line L3, the V-phase power supply line L4, and the W-phase power supply line L5 break.

When the operation line L7 breaks, no direct current flows through the coils 51b to 53b of the relays 51 to 53. Therefore, the COM terminal is coupled to the NC terminal at each of the coupling members 51a to 53a. Accordingly, the U-phase motor line L10, the V-phase motor line L11, and the W-phase motor line L12 are coupled to each other through the coupling members 51a to 53a, and the coils 22 of respective phases of the motor 3 are short-circuited to each other.

Thus, when the rotor 23 continues to rotate after the wheel 2 comes off the vehicle body 9 while the vehicle 1 is moving, the three-phase coils 22 are short-circuited to each other through the short-circuit line L13, so that no induced voltage is generated in the motor 3 (between the motor lines). Therefore, damage, such as electric shock, can be reduced.

In addition, a circulation current flows through the three-phase coils 22 to generate Lorentz force that stops the rotation of the rotor 23. Therefore, the rotor 23 can be quickly stopped, and damage may be further reduced.

In addition, when the harness 8 breaks, the motor lines are not exposed. Therefore, damage, such as electric shock, can be further reduced.

Variation in the voltage between the motor lines in case of a small overlap collision of the vehicle 1 will now be described with reference to FIG. 4.

Figure 4:
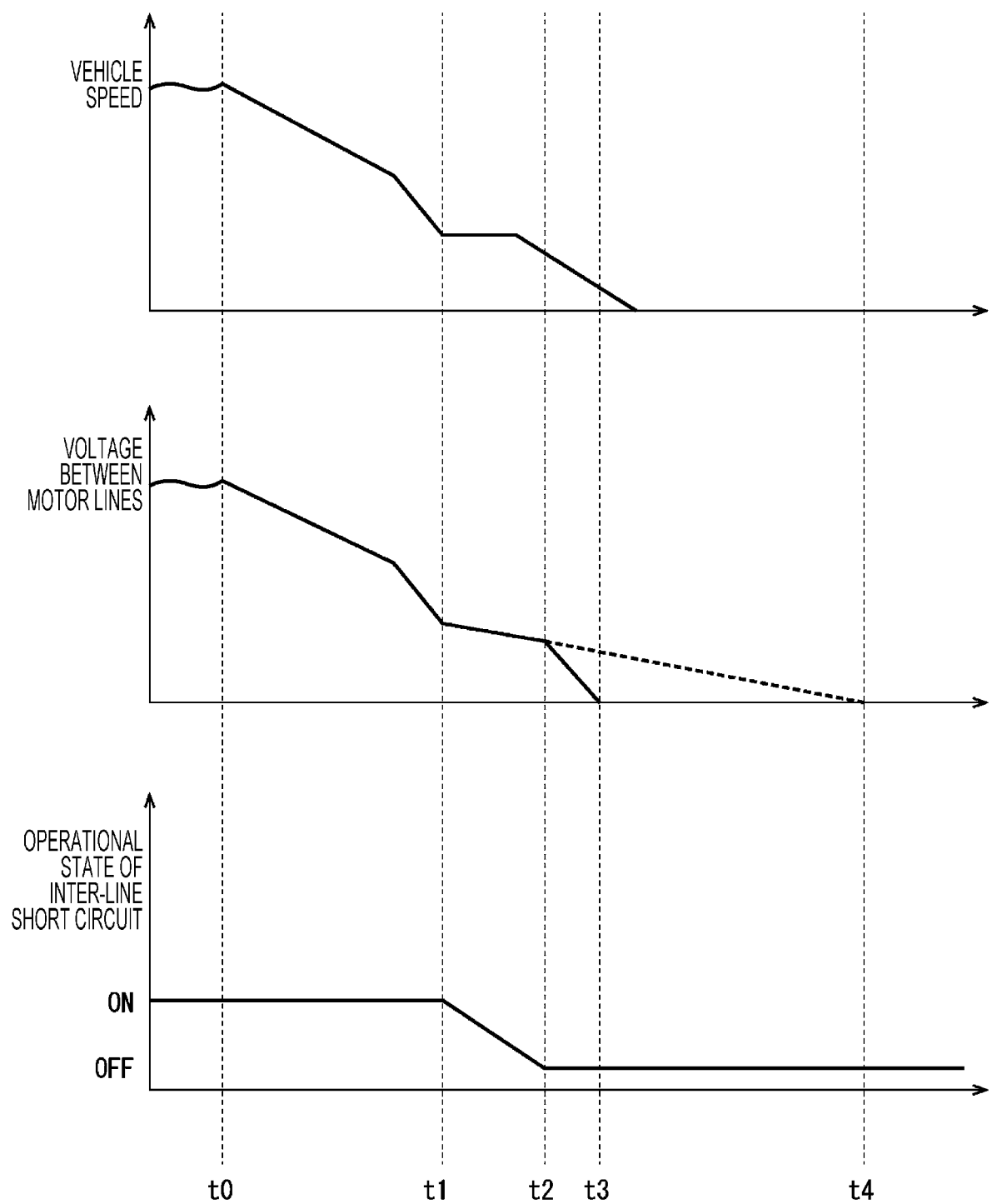
FIG. 4 illustrates variation in a voltage between motor lines in case of a collision.

FIG. 4 illustrates variation in the voltage between the motor lines in case of a collision. The graph at top of FIG. 4 illustrates the vehicle speed in case of a collision. The graph at the center of FIG. 4 illustrates the voltage between the motor lines in case of a collision. The graph at the bottom of FIG. 4 illustrates the operational state of the inter-line short circuit 7 in case of a collision.

Referring to FIG. 4, assume that the vehicle 1 experiences a small overlap collision at time t0 and the wheel 2 comes off the vehicle body 9 at time t1. In this case, the vehicle speed and the voltage between the motor lines both decrease in the period from time t0 to time t1.

When the wheel 2 comes off the vehicle body 9 at time t1 and the harness 8 breaks, the inter-line short circuit 7 stops operating (is turned OFF) in the period from time t1 to time t2, so that the three-phase coils 22 are short-circuited to each other through the short-circuit line L13. After that, a circulation current flows through the three-phase coils 22 to generate Lorentz force that stops the rotation of the rotor 23. Therefore, the rotor 23 is stopped at time t3.

When the operation circuit 6 and the inter-line short circuit 7 are not provided, the three-phase coils 22 are not short-circuited to each other, and Lorentz force that stops the rotation of the rotor 23 is not generated. Therefore, as indicated by the dashed line in the graph at the center of FIG. 4, the rotor 23 is stopped at time t4 that is after time t3.

Figure 5:
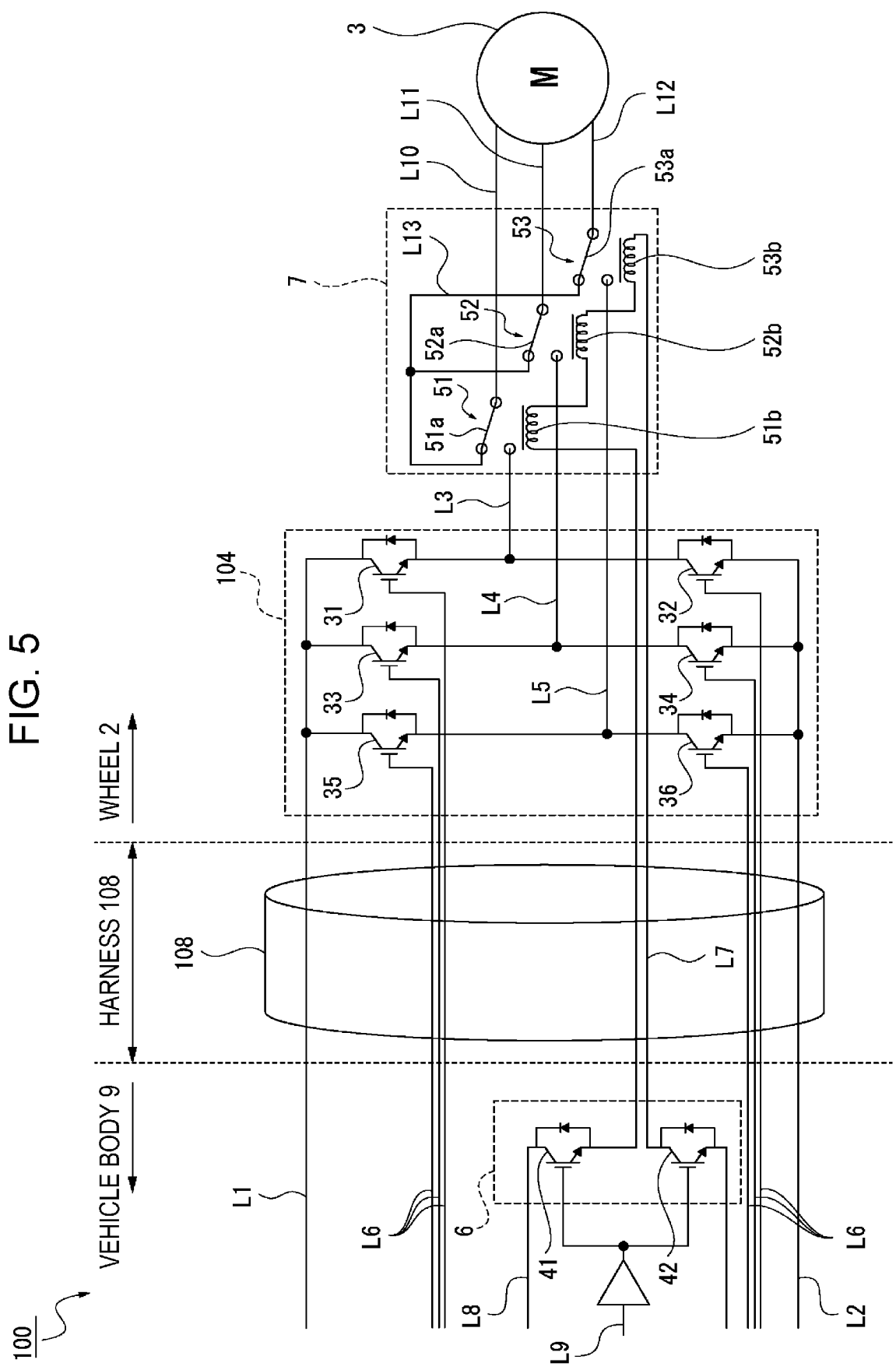
FIG. 5 illustrates electrical couplings in a vehicle according to a second embodiment.

FIG. 5 illustrates electrical couplings in a vehicle 100 according to a second embodiment. Structures that are the same as those in the vehicle 1 according to the first embodiment are denoted by the same reference signs, and description thereof is omitted.

As illustrated in FIG. 5, the vehicle 100 according to the second embodiment differs from the vehicle 1 according to the first embodiment in that an inverter 104 is provided in the wheel 2.

Since the inverter 104 is provided in the wheel 2, the vehicle 100 includes a harness 108 in which the direct-current power supply line L1, the direct-current power supply line L2, the signal lines L6, and the operation line L7 are bundled.

When the vehicle 100 is externally impacted in a small overlap collision, for example, and the wheel 2 comes off the vehicle body 9, the harness 108 breaks. The operation line L7 is configured to break more easily than at least the direct-current power supply line L1 and the direct-current power supply line L2, and therefore breaks before the direct-current power supply line L1 and the direct-current power supply line L2 break.

When the operation line L7 breaks, no direct current flows through the coils 51b to 53b of the relays 51 to 53. Therefore, the COM terminal is coupled to the NC terminal at each of the coupling members 51a to 53a. Accordingly, the U-phase motor line L10, the V-phase motor line L11, and the W-phase motor line L12 are coupled to each other through the coupling members 51a to 53a, and the coils 22 of respective phases of the motor 3 are short-circuited to each other.

Accordingly, similarly to the vehicle 1 according to the first embodiment, damage, such as electric shock, can be reduced.

FIG. 6 illustrates electrical couplings in a vehicle 200 according to a third embodiment. Structures that are the same as those in the vehicle 1 according to the first embodiment are denoted by the same reference signs, and description thereof is omitted. FIG. 6 illustrates only electrical couplings in a region including harnesses 208 in the vehicle 200.

As illustrated in FIG. 6, the vehicle 200 according to the third embodiment differs from the vehicle 1 according to the first embodiment in that the U-phase power supply line L3, the V-phase power supply line L4, and the W-phase power supply line L5 extend between the wheel 2 and the vehicle body 9 through respective ones of the independent harnesses 208.

The operation line L7 extends from the vehicle body 9 to the wheel 2 through the harness 208 of the U-phase power supply line L3, from the wheel 2 to the vehicle body 9 through the harness 208 of the V-phase power supply line L4, and then from the vehicle body 9 to the wheel 2 through the harness 208 of the W-phase power supply line L5.

Thus, the single operation line L7 extends back and forth between the wheel 2 and the vehicle body 9 and is bundled with different ones of the U-phase power supply line L3, the V-phase power supply line L4, and the W-phase power supply line L5 in the harnesses 208. In other words, the power supply lines (U-phase power supply line L3, V-phase power supply line L4, and W-phase power supply line L5) are individually bundled with the operation line L7 in the harnesses 208.

When the vehicle 200 is externally impacted in a small overlap collision, for example, and the wheel 2 comes off the vehicle body 9, a breakage of any one of the harnesses 208 causes a breakage of the operation line L7, and no direct current flows through the coils 51b to 53b of the relays 51 to 53. Therefore, the COM terminal is coupled to the NC terminal at each of the coupling members 51a to 53a. Accordingly, the U-phase motor line L10, the V-phase motor line L11, and the W-phase motor line L12 are coupled to each other through the coupling members 51a to 53a, and the coils 22 of respective phases of the motor 3 are short-circuited to each other.

Accordingly, similarly to the vehicle 1 according to the first embodiment, damage, such as electric shock, can be reduced.

As described above, the vehicle 1 according to the above-described embodiment includes the motor 3, the inverter 4, the inter-line short circuit 7, the operation circuit 6, and the harness 8. The motor 3 is provided in the wheel 2. The inverter 4 supplies electric power to the motor 3. The inter-line short circuit 7 is provided in the wheel 2. The inter-line short circuit 7 causes the motor 3 to be short-circuited when the inter-line short circuit 7 is not operated and couples the motor 3 and the inverter 4 the inter-line short circuit 7 is operated. The operation circuit 6 is provided in the vehicle body 9 and operates the inter-line short circuit 7. The harness 8 extends between the wheel 2 and the vehicle body 9. In the harness 8, at least one power supply line (direct-current power supply lines L1 and L2, U-phase power supply line L3, V-phase power supply line L4, W-phase power supply line L5) and the operation line L7 are bundled. The at least one power supply line supplies electric power to the motor 3 through the inverter 4 and the inter-line short circuit 7. The operation line L7 couples the inter-line short circuit 7 and the operation circuit 6.

Accordingly, in the vehicle 1, the harness 8 breaks when the wheel 2 comes off the vehicle body 9. At this time, the operation line L7 breaks, and the operation of the inter-line short circuit 7 by the operation circuit 6 is stopped. As a result, the motor 3 is short-circuited by the inter-line short circuit 7.

Therefore, no induced voltage is generated in the motor 3, so that safety of the vehicle 1 in case of separation of the wheel can be increased.

The operation line L7 may be configured to break more easily than the at least one power supply line (direct-current power supply lines L1 and L2, U-phase power supply line L3, V-phase power supply line L4, W-phase power supply line L5).

Accordingly, in the vehicle 1, the operation line L7 breaks before the power supply line breaks when the wheel 2 comes off the vehicle body 9.

Therefore, the motor 3 can be short-circuited before the power supply line breaks, and safety of the vehicle 1 in case of separation of the wheel can be further increased.

The inverter 4 may be provided in the vehicle body 9, and the at least one power supply line may include a plurality of power supply lines (U-phase power supply line L3, V-phase power supply line L4, and W-phase power supply line L5). Each of the plurality of power supply lines may be individually bundled with the operation line L7 in the harness 8.

Accordingly, in the vehicle 1, when the wheel 2 comes off the vehicle body 9, the operation line L7 breaks before any of the power supply lines breaks.

Therefore, the motor 3 can be short-circuited before any of the power supply lines breaks, and safety of the vehicle 1 in case of separation of the wheel can be further increased.

In addition, the inverter 4 may be provided in the wheel 2, and the at least one power supply line (direct-current power supply lines L1 and L2) may supply electric power to the inverter 4.

Accordingly, in the vehicle 1, when the wheel 2 comes off the vehicle body 9, the operation line L7 breaks before the power supply line that supplies electric power to the inverter 4 breaks.

Therefore, the motor 3 can be short-circuited before the power supply line breaks, and safety of the vehicle 1 in case of separation of the wheel can be further increased.

The inter-line short circuit 7 may be disposed in the motor 3.

In such a case, when an external impact of a collision is transmitted to the wheel 2, the possibility that the motor 3 cannot be short-circuited due to damage to the inter-line short circuit 7 can be reduced.

Although embodiments of the disclosure have been described, the disclosure is not limited to the above-described examples, and may have various configurations.

For example, although the motor 3 described above is a radial gap motor, the motor 3 may instead be an axial gap motor.

The invention claimed is:

1. A vehicle comprising:
a motor provided in a wheel;
an inverter configured to supply electric power to the motor;
an inter-line short circuit provided in the wheel and configured to cause the motor to be short-circuited in a case where the inter-line short circuit is not operated and couple the motor and the inverter in a case where the inter-line short circuit is operated;
an operation circuit provided in a vehicle body of the vehicle and configured to operate the inter-line short circuit; and
at least one harness that extends between the wheel and the vehicle body and in which at least one power supply line and an operation line are bundled, the at least one power supply line being configured to supply electric power to the motor through the inverter and the inter-line short circuit, and the operation line being configured to couple the inter-line short circuit and the operation circuit.

2. The vehicle according to claim 1, wherein the operation line is configured to break more easily than the at least one power supply line.

3. The vehicle according to claim 1, wherein
the inverter is provided in the vehicle body,
the at least one power supply line comprises multiple power supply lines, and the at least one harness comprises multiple harnesses, and
the multiple power supply lines are individually bundled with the operation line in the respective harnesses.

4. The vehicle according to claim 2, wherein
the inverter is provided in the vehicle body,
the at least one power supply line comprises multiple power supply lines, and the at least one harness comprises multiple harnesses, and
the multiple power supply lines are individually bundled with the operation line in the respective harnesses.

5. The vehicle according to claim 1, wherein the inverter is provided in the wheel, and
wherein the at least one power supply line supplies electric power to the inverter.

6. The vehicle according to claim 2, wherein the inverter is provided in the wheel, and
wherein the at least one power supply line supplies electric power to the inverter.

7. The vehicle according to claim 1, wherein the inter-line short circuit is disposed in the motor.

8. The vehicle according to claim 2, wherein the inter-line short circuit is disposed in the motor.

9. The vehicle according to claim 3, wherein the inter-line short circuit is disposed in the motor.

10. The vehicle according to claim 4, wherein the inter-line short circuit is disposed in the motor.

11. The vehicle according to claim 5, wherein the inter-line short circuit is disposed in the motor.

12. The vehicle according to claim 6, wherein the inter-line short circuit is disposed in the motor.

* * * * *